Figure 1:
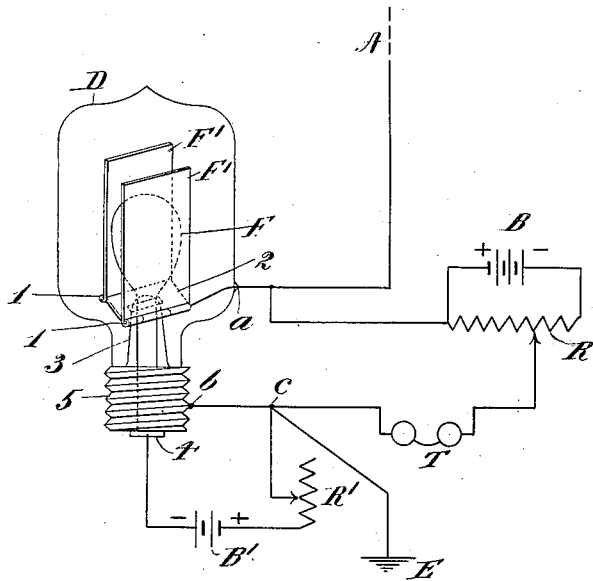

No. 841,386. PATENTED JAN. 15, 1907.
L. DE FOREST.
WIRELESS TELEGRAPHY.
APPLICATION FILED AUG. 27, 1906.

2 SHEETS—SHEET 1.

WITNESSES:
Frank G. Parker
John Buckler

INVENTOR:
Lee de Forest
by Geo. K. Woodworth
Atty.

No. 841,386. PATENTED JAN. 15, 1907.
L. DE FOREST.
WIRELESS TELEGRAPHY.
APPLICATION FILED AUG. 27, 1906.

2 SHEETS—SHEET 2.

WITNESSES:
Frank G. Parker
John Buckler

INVENTOR:
Lee de Forest
by Geo. K. Woodworth
Atty.

UNITED STATES PATENT OFFICE.

LEE DE FOREST, OF NEW YORK, N. Y.

WIRELESS TELEGRAPHY.

No. 841,386.　　　Specification of Letters Patent.　　　Patented Jan. 15, 1907.

Application filed August 27, 1906. Serial No. 332,213.

*To all whom it may concern:*

Be it known that I, LEE DE FOREST, a citizen of the United States, and a resident of New York, in the county of New York and State of New York, have invented a new and useful Improvement in Wireless Telegraphy, of which the following is a specification.

My invention relates to wireless telegraphy and more particularly to an oscillation-detector which, in addition to performing the usual functions of such detectors, may be used as a tuning device and as a static valve, and which has a variety of other uses.

I have discovered that if the gaseous medium intervening between separated electrodes be put into a condition of molecular activity, as by heating the same or otherwise, said medium becomes highly sensitive to electrical oscillations, as more fully set forth in my application, Serial No. 243,913.

I have shown in my application, Serial No. 300,975, that the sensitiveness of an oscillation-detector comprising electrodes separated by such sensitive gaseous medium may be varied by the action of a magnetic field, so that the response of said detector *per se* is a function of a characteristic, such as the frequency, of the electrical oscillations operating upon the same. Thus, for certain frequencies a magnetic field of given strength will greatly decrease the sensitiveness of the detector and render it practically non-responsive, while for other frequencies the same magnetic field will greatly increase the sensitiveness of the detector. In short, said detector *per se* may be made selectively responsive without having recourse to tuned or resonant circuits, so that the use of such circuits may be dispensed with and the detector itself employed to perform the functions heretofore effected by said circuits.

The subject-matter of the present invention is an oscillation-detector which, like that above referred to, may be made selectively responsive to electrical oscillations having a given frequency or electrical rate of vibration but which does not require a proximate magnetic field for this purpose; and which also may be made selectively responsive to electrical oscillations having a given spark, or wave-train, frequency—that is to say, may be so adjusted that its response to electrical oscillations is a function of the number of groups or trains of waves per second, irrespective of the electrical frequency of such waves.

By virtue of the selective properties of my oscillation-detector as above set forth, I am enabled to employ said detector as a tuning device and also as a static valve or leak; and on account of its indestructibility I am enabled to employ the detector in those systems where large amounts of energy are created in the immediate proximity of said detector, such, for example, as the duplex systems described in my United States Letters Patent No. 772,879, dated October 18, 1904, and in the systems which permit "breaking" between two operators as set forth in my United States Letters Patent Nos. 827,523 and 827,524, dated July 31, 1906.

My invention may best be understood by having reference to the drawings which accompany and form a part of this specification and which diagrammatically illustrate four embodiments thereof which have successfully been employed; but I do not wish to limit myself to the details shown therein inasmuch as many other forms of construction and arrangement of circuits embodying the principles of my invention, as particularly pointed out in the appended claims, will readily occur to those skilled in the art.

Figure 2:
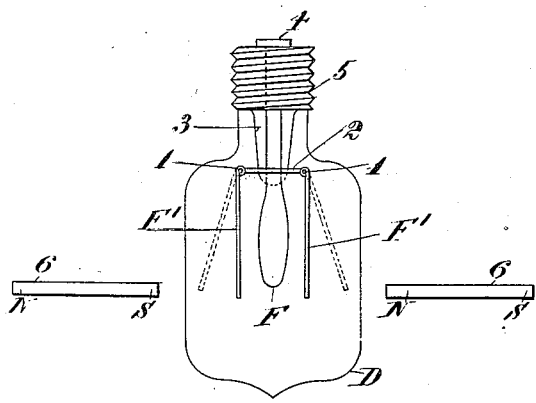
Figure 3:
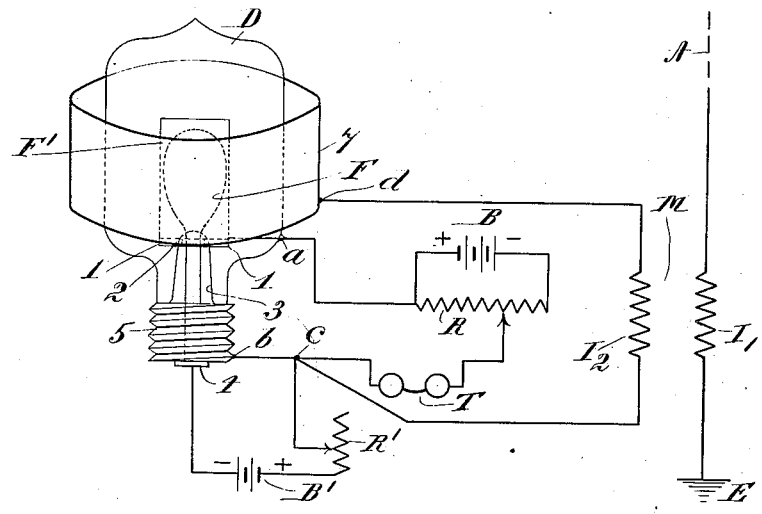
Figure 4:
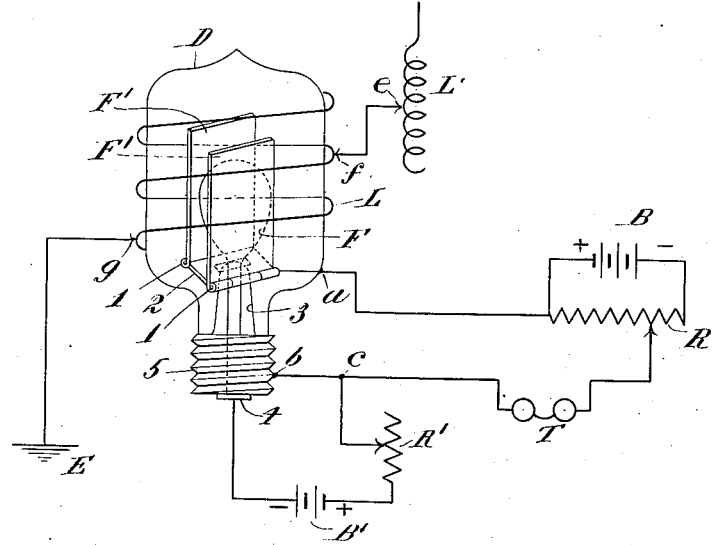

In the drawings, Figure 1 represents a simple form of my oscillation-detector conductively connected with a receiving-antenna. Fig. 2 represents a detail of construction used in connection with the detectors shown in Figs. 1, 3 and 4. Fig. 3 represents a modification of the detector shown in Fig. 1 in which the detector is energized by an electric field developed by the oscillations to be detected. Fig. 4 represents a further modification in which the detector is energized by a magnetic field created by the oscillations to be detected.

In the figures, A is a receiving-antenna.

E is an earth connection.

M is a transformer, of which $I_1$ and $I_2$ are the primary and secondary windings.

B B' are batteries.

R R' are resistances.

L L' are inductances.

T is a telephone or other signal-indicating device.

D represents an evacuated vessel of glass or other suitable material having two separated electrodes F and F' between which intervenes the gaseous medium which, when sufficiently heated or otherwise made highly conducting, forms the sensitive element of my oscillation-detector. While various means may be employed for heating said gaseous medium I find it convenient to employ electrical means and, therefore, I prefer to employ as the electrode F a filament of carbon or metal and to connect the same in series with a battery B' and a rheostat R'. I have ascertained that a filament of metal, especially one of tantalum, renders the oscillation-detector much more sensitive than one of carbon.

The electrode F' may consist of a non-heated metallic body such, as shown in the present instance, as the wings or plates F' F' secured to the metallic base 2, which may be supported by the upwardly-extending portion 3 of the vessel D, although any suitable means may be used to support the electrodes F' within said vessel.

While I have shown and described the electrode F' as consisting of two wings or flat plates, it will be understood that said electrode may have any other form suitable for the purpose, although I have found that better results are obtained by using two flat plates or wings than by using a flattened cylinder and that a flattened cylinder gives better results than a cylinder of circular section. The reason for this is that the sensitiveness of the device, other things being equal, depends in a measure upon the distance between the electrodes F F', and the minimum separation can be obtained by using flat plates for the electrode F'. As will be obvious, the electrode F' may consist of one flat plate.

The evacuated vessel D may be provided with a screw-socket 5 after the manner of ordinary incandescent lamps, and one end of the filament F may be conductively connected thereto while the other end may be insulated therefrom and conductively connected to the contact-piece 4 in the base of the socket. In such case the terminals of the heating battery B' are connected respectively to the socket at $b$ and to the contact-piece 4.

The terminals of the local circuit, which includes the battery B and signal-indicating device, such as the telephone T, are connected respectively to the electrodes F and F' at $a$ and $b$. Means may be included in or associated with the local circuit for varying the potential developed by the local circuit B between the points $a$ and $b$. For this purpose the number of cells which make up the battery B may be varied, or the adjustable resistance R, which, with the battery, constitutes a potentiometer, may be used.

The oscillation-detector, as above described, may be associated with the receiving system in a variety of ways now well known in the art by connecting the electrode F to one of the terminals of the source of oscillations and the electrode F' to the other terminal thereof. In the present instance the antenna A is connected to the electrode F' by a leading-in wire which is connected to the base 2 and which is sealed in the vessel D at $a$, and the earth-connector is connected to the electrode F through the socket 5 and the conductor $b$ $c$.

It is preferable that the positive pole of the battery B should be connected to the electrode F', and better results are obtained if the negative pole of the battery B be connected to that end of the filament F to which the positive pole of the battery B' is connected, (shown in Figs. 1, 3, and 4 as that end of said filament which is connected to the screw-socket.)

By regulating and adjusting the amount of heating-current flowing in the circuit of the battery B', the sensitiveness of my detector may be varied, so that the response of the detector per se will be a function of the frequency of the electrical oscillations operating upon the same, and said detector itself, as distinguished from the circuit in which it is included, will be selectively responsive to oscillations having a given electrical frequency. For regulating and adjusting the heating-current flowing through the filament F, I may employ the rheostat R' or any other means suitable for the purpose.

For tuning the oscillation-detector to oscillations of given electrical frequency, the amplitude of the heating-current must be determined empirically, as by adjusting the rheostat R', because a number of factors such, for example, the separation of the electrodes F F' and the difference of potential developed by battery B across the points $a$ $b$, are involved.

By regulating and adjusting the potential impressed by the battery B across the electrodes F F', the sensitiveness of the detector may be varied so that the response of the detector per se, other things being equal, will be a function not only of the electrical frequency or wave length of the oscillations operating upon the detector, but also of the spark frequency which, caeteris paribus, is a measure of the total energy received, and the detector itself, as distinguished from a circuit tuned electrically to electrical or to spark frequency and from a mechanism tuned mechanically or acoustically to spark frequency, will be selectively responsive to oscillations having a given electrical frequency, and also to oscillations having a given spark frequency irrespective of their electrical frequency or wave length. Thus, with a given separation of the electrodes F F' and a given amplitude of heating-current flowing through the filament F, I have been able by merely varying the potential of the battery B to attune the oscillation-detector to the oscillations developed in the receiving system by one of several transmitting systems and to receive the energy thereof to the exclusion of the energies of the oscillations developed therein by the other of said transmitting systems, even when the several sets of oscillations had the same electrical frequency and wave length, but differed in spark frequency or in average energy conveyed per unit of time. Here also the adjustment of the potential impressed by the battery B upon the electrodes F F' must be determined empirically.

By virtue of the selective properties of my detector, as above set forth, I am enabled to effect by the detector itself a method of double-tuning which affords the greatest security from waves the energy of which is not intended to affect the detector as well as from atmospheric or "static" electricity and other disturbing electrical forces.

As above mentioned, the sensitiveness of my oscillation detector, which in common with others of my invention employing a conducting gaseous medium as the sensitive element I call the "audion," is a function of the separation of the electrodes or of the length of the sensitive conducting gaseous medium; but I find that here again the frequency is a determining factor, so that by varying the separation of the electrodes I can make the response of the audion a function of the frequency. In other words, by suitably varying the length of the interelectrode medium, other adjustments, such as those of the batteries B B', remaining unchanged, I am enabled to make the audion *per se* selectively responsive to oscillations of a given frequency independently of the usual tuned or resonant circuit heretofore employed in wireless telegraphy as a current or oscillation selector.

A convenient means of varying the distance between the electrodes F F is to hinge the wings which constitute the electrode F' to the base 2 as by the hinges 1 1. By approaching the magnets 6 6 to the inverted tube, as shown in Fig. 2, the wings, which may be made wholly or partly of iron, will open outwardly away from the filament and thereby increase the path of the conducting ions in the interelectrode medium.

When the audion is to be attuned to oscillations of a given frequency by varying the separation of the electrodes, the adjustment produced by the magnets 6 6 must be empirically determined, just as the adjustments of the batteries B B , above referred to are purely empirical.

It will be understood that each of the three methods above set forth for varying the response of the audion in accordance with the electrical frequency and the spark frequency of the oscillations to be detected may be separately employed and also that any two or all three of said methods may be used conjointly. For example, by appropriately varying the separation of the electrodes F F' and the amplitude of the heating-current from the battery B', the audion may be made selectively responsive to waves of a given electrical frequency, and then by the regulation and adjustment of the potential impressed upon the audion by the battery B, the audion may be made to select a particular one of a number of sets of waves all having the said electrical frequency and wave length, but each set having a spark frequency different from that of any other set.

The oscillation-detectors shown in Figs. 3 and 4 are identical in construction with those above described in connection with Figs. 1 and 2, and differ therefrom merely in the manner in which they are associated with the source of oscillations to be detected.

In Fig. 3, 7 represents a metallic member brought into proximity with the vessel D and shown in the present instance as a cylinder surrounding said vessel. In this case one terminal of the oscillation source which in the present instance is shown as a circuit including the secondary of the transformer M, is conductively connected to the cylinder 7 at the point d, while the other terminal may be connected to either one of the electrodes F or F' and in the present instance is shown as connected to the electrode F through the socket 5 and conductor b c. In this case the oscillating electric field developed by the electrical oscillations in the secondary circuit, which includes the secondary winding $I_2$, operates to alter the conducting properties of the sensitive conducting gaseous medium in the vessel D and thereby to vary the current flowing in the local circuit which includes the telephone T, just as in the case of the system shown in Fig. 1 in which the terminals of the oscillation source are connected directly to the interelectrode medium.

The arrangement shown in Fig. 3 affords a fourth method of rendering the audion selectively responsive, for in addition to the three methods above set forth in connection with Figs. 1 and 2 I find that, other things being equal, the response of the audion to oscillations of a given frequency is a function of the area of the surface of the number 7 and of the separation thereof from the elements within the vessel D.

If the form shown in Fig. 3 be employed, the cylinder 7 may be moved with respect to the axis of the vessel D until, *cæteris paribus*, the response of the audion is a maximum for oscillations of a given frequency. It will be understood of course that the separation of the electrodes F, F', and the values of the resistances R, R', of the audion shown in Fig. 3 may all be varied in the manner above explained in connection with Figs. 1 and 2.

When the connections shown in Fig. 3 are used I find that the quality of the sound produced in the telephone T is quite different from that produced therein when the connections shown in Fig. 1 are used, although the sounds may be, and under the same conditions are, of equal intensity. When the connections shown in Fig. 1 are employed, the sounds produced by the telephone are sharp and crackling, as is the case where various other forms of oscillation-detector are employed; but when the connections shown in Fig. 3 are used, the sounds produced by the telephone, under the same conditions as before, are muffled or drummy. This latter sound is distinctive and is not produced by the use of any other form of oscillation-detector so far as I am aware. The advantage of obtaining the latter sound in the telephone is that it may readily be distinguished from the sounds produced therein by atmospheric electricity, whereas the sharp crackling sounds produced in the telephone by the signal-waves when other types of oscillation-detector are used very nearly imitate the sounds produced therein by static disturbances or atmospheric electricity.

In the arrangement shown in Fig. 4 the audion is energized by the oscillating magnetic field developed by the passage of the oscillations to be detected through the coil L which surrounds the sensitive conducting gaseous medium and which in the present instance is wound around the outside of the tube. This coil preferably is made adjustable, as by the contacts $f$ and $g$, and the antenna A may include an inductance L' having an adjusting-contact $e$. It will be understood that the adjustments of the separation of the electrodes F, F', of the amplitude of the heating-current and of the value of the potential impressed between the points $a$ and $b$, as set forth above in connection with Fig. 1, may also be employed to render the audion shown in Fig. 4 selectively responsive. I have ascertained also that the variation of the magnetic field created by the passage of oscillations through the coil L varies the response of the audion, other things being the same, and furthermore that this variation also is a function of frequency. In other words, having adjusted the audion to be most responsive to oscillations of given frequency in the manner above described in connection with Fig. 1, there may be found empirically a certain position for the contacts $f$ or $g$, at which for oscillations of a said frequency the response of the detector is a maximum.

The syntonizing-inductance L', or other electrical tuning device, may be employed in connection with any of the several embodiments of my present invention so as to combine the selectivity of the antenna or tuned receiving-circuit with the selective properties of the oscillation-detector itself, and in such cases I have found the selectivity of a receiving system so constructed to be very high indeed.

It will be understood that in all cases, if desired, the vessel D may include the vapor of a halogen salt or other substance the vapor of which is conducting or a gas whose conductivity is greater than that of air under an attenuated pressure.

I claim—

1. An electrical-oscillation-selecting device comprising a vessel, a filament sealed in said vessel, a source of electric current connected in series with said filament, means for varying the amplitude of said current, whereby said device is rendered selective of electrical oscillations having a given electrical frequency, a member of conducting material inclosed within said vessel and a circuit connecting said member with said filament.

2. An electrical-oscillation-selecting device comprising a vessel, a filament sealed in said vessel, a source of electric current connected in series with said filament, a member of conducting material inclosed within said vessel, a circuit connecting said member with said filament, a source of electromotive force associated with said circuit and means for varying said electromotive force, whereby said device is rendered selective of electrical oscillations having a given spark frequency.

3. An electrical-oscillation-selecting device comprising a vessel, a filament sealed in said vessel, a source of electric current connected in series with said filament, means for varying the amplitude of said current, whereby said device is rendered selective of electrical oscillations having a given electrical frequency, a member of conducting material inclosed within said vessel, a circuit connecting said member and said filament, a source of electromotive force associated with said circuit and means for varying said electromotive force, whereby said device is rendered selective of electrical oscillations having a given spark frequency.

4. An electrical-oscillation-selecting device comprising a vessel inclosing a gaseous medium maintained in a condition of molecular activity, two electrodes inclosed within said vessel, and means for varying the separation of said electrodes.

5. An electrical-oscillation-selecting device comprising a vessel inclosing a gaseous medium maintained in a condition of molecular activity, two electrodes inclosed within said vessel, and means outside said vessel for varying the separation of said electrodes.

6. An electrical-oscillation-selecting device comprising a vessel, a filament sealed in said vessel, a source of electric current connected in series with said filament, a member of conducting material inclosed within said vessel, a circuit connecting said filament and said member and means for varying the separation of said filament and said member.

7 An electrical-oscillation-selecting device comprising a vessel, a filament sealed in said vessel, a source of electric current connected in series with said filament, and means for varying the amplitude of said current, whereby said device is rendered selective of electrical oscillations having a given electrical frequency.

8. An electrical-oscillation-selecting device comprising a vessel, a filament sealed in said vessel, a source of electric current connected in series with said filament, a member of conducting material inclosed within said vessel, a circuit connecting said filament with said member, a source of electromotive force associated with said circuit, means for varying said electromotive force and means for varying the separation of said filament and said member.

9. An electrical-oscillation-selecting device comprising a vessel, a filament sealed in said vessel, a source of electric current connected in series with said filament, means for varying the amplitude of said current, whereby said device is rendered selective of electrical oscillations having a given electrical frequency, a conductor inclosed within said vessel, a circuit connecting said conductor and filament, a source of electromotive force associated with said circuit and means for varying said electromotive force, whereby said device is rendered selective of electrical oscillations having a given spark frequency.

10. An oscillation-detector and means whereby said detector *per se* is rendered selective of electrical oscillations having a given spark frequency.

11. An oscillation-detector, means whereby said detector *per se* is rendered selective of electrical oscillations having a given electrical frequency and means whereby said detector *per se* is rendered selective to electrical oscillations having a given spark frequency.

12. An electrical-oscillation-selecting device comprising a vessel containing a sensitive conducting gaseous medium, two electrodes within said vessel, a local circuit connecting said electrodes, a receiving-circuit having one terminal connected with one of said electrodes, a conducting member outside said vessel and movable with respect thereto, and an electrical connection from the other terminal of said receiving-circuit to said conducting member.

13. An electrical-oscillation-selecting device comprising a vessel inclosing a gaseous medium maintained in a condition of molecular activity, two electrodes inclosed within said vessel, means for impressing an electrical potential upon said electrodes, and means for varying said potential.

14. An electrical-oscillation-selecting device comprising a vessel inclosing a gaseous medium, an electrode within said vessel, means for heating said electrode, means for regulating the temperature thereof, a second electrode inclosed within said vessel and a circuit connecting said electrodes.

15. An electrical-oscillation-selecting device comprising a vessel inclosing a gaseous medium, an electrode within said vessel, means for heating said electrode, means for regulating the temperature thereof, a second electrode inclosed within said vessel, means for impressing an electrical potential upon said electrodes and means for varying said potential.

16. An electrical-oscillation-selecting device comprising a vessel inclosing a gaseous medium maintained in a condition of molecular activity, two electrodes inclosed within said vessel, a local circuit connecting said electrodes and means for varying the separation of said electrodes.

17. An electrical-oscillation-selecting device comprising a vessel inclosing a gaseous medium, an electrode within said vessel, means for heating said electrode, means for varying the temperature thereof, a second electrode inclosed within said vessel and means for varying the separation of said electrodes.

18. An electrical-oscillation-selecting device comprising a vessel inclosing a gaseous medium, an electrode within said vessel, means for heating said electrode, means for varying the temperature thereof, a second electrode inclosed within said vessel, a circuit connecting said electrodes, an adjustable source of electromotive force associated with said electrodes, and means for varying the separation of said electrodes.

19. An electrical-oscillation detector comprising a vessel inclosing a gaseous medium, means for maintaining said gaseous medium in a condition of molecular activity, a member in proximity to said vessel, and an oscillation-circuit electrically connected to said member and to said gaseous medium.

20. An electrical-oscillation-selecting device comprising a vessel inclosing a gaseous medium, means for heating said medium, and means for varying the temperature thereof, whereby said device is rendered selective of electrical oscillations having a given electrical frequency.

21. An oscillation-detector comprising two conductively-connected flat plates of conducting material inclosed within an evacuated vessel, an electrode sealed within said vessel and located between said plates, and means for heating said electrode.

22. An oscillation-detector comprising two conductively-connected flat plates of conducting material inclosed within an evacuated vessel, a metallic filament sealed within said vessel and located between said plates, and means for heating said filament.

23. An oscillation-detector comprising two conductively-connected flat plates of conducting material inclosed within an evacuated vessel, a filament of tantalum sealed within said vessel and located between said plates, and means for heating said filament.

24. An oscillation-detector comprising two flat plates of conducting material inclosed within an evacuated vessel, an electrode sealed within said vessel and located between said plates, and means for heating said electrode.

25. An oscillation-detector comprising two flat plates of conducting material inclosed within an evacuated vessel, a filament sealed within said vessel and located between said plates, and means for heating said filament.

In testimony whereof I have hereunto subscribed my name this 24th day of August, 1906.

LEE DE FOREST.

Witnesses:
 GEO. E. TERRY,
 GEO. K. WOODWORTH.